(12) United States Patent
Han et al.

(10) Patent No.: US 10,680,490 B2
(45) Date of Patent: Jun. 9, 2020

(54) RESOLVER

(71) Applicants: Hyundai Motor Company, Seoul (KR); Kia Motors Corporation, Seoul (KR)

(72) Inventors: Dong Yeon Han, Seoul (KR); Hyoung Jun Cho, Suwon-si (KR); Yo Sub Sim, Gyeongsangbuk-do (KR); Won Yong Lee, Seoul (KR); Kyu Jong Lee, Anyang-si (KR)

(73) Assignees: Hyundai Motor Company (KR); KIA Motors Corporation (KR)

( * ) Notice: Subject to any disclaimer, the term of this patent is extended or adjusted under 35 U.S.C. 154(b) by 0 days.

(21) Appl. No.: 16/214,604

(22) Filed: Dec. 10, 2018

(65) Prior Publication Data

US 2019/0190343 A1 Jun. 20, 2019

(30) Foreign Application Priority Data

Dec. 20, 2017 (KR) ........................ 10-2017-0175873

(51) Int. Cl.
| | | |
|---|---|---|
| *H02K 11/00* | (2016.01) | |
| *H02K 5/22* | (2006.01) | |
| *H02K 24/00* | (2006.01) | |
| *H02K 3/12* | (2006.01) | |
| *H02K 3/34* | (2006.01) | |
| *H02K 11/225* | (2016.01) | |
| *H02K 11/21* | (2016.01) | |
| *H02K 1/24* | (2006.01) | |

(52) U.S. Cl.
CPC ................. *H02K 5/22* (2013.01); *H02K 3/12* (2013.01); *H02K 3/34* (2013.01); *H02K 11/21* (2016.01); *H02K 11/225* (2016.01); *H02K 24/00* (2013.01); *H02K 1/24* (2013.01)

(58) Field of Classification Search
CPC .......... H02K 3/522; H02K 3/38; H02K 1/148; H02K 11/27; H02K 11/215; H02K 1/28; H02K 11/225
USPC .......................................... 310/68 B, 89, 194
See application file for complete search history.

(56) References Cited

U.S. PATENT DOCUMENTS

| | | | | |
|---|---|---|---|---|
| 6,127,753 A | * | 10/2000 | Yamazaki ............... | H02K 3/522 310/194 |
| 8,450,898 B2 | * | 5/2013 | Sears ...................... | H02K 3/522 310/194 |
| 8,917,006 B2 | * | 12/2014 | Jang ........................ | H02K 3/522 310/214 |
| 8,917,007 B2 | * | 12/2014 | Matsuzaki .......... | F04D 13/0666 310/216.007 |
| 2005/0194860 A1 | * | 9/2005 | Lee ........................ | H02K 1/148 310/216.001 |

(Continued)

*Primary Examiner* — Thanh Lam
(74) *Attorney, Agent, or Firm* — Brinks Gilson & Lione

(57) ABSTRACT

The present disclosure provides a resolver including a stator core, an insulation cover for covering and insulating the stator core, an upper protection cover coupled to an upper portion of the insulation cover to cover and protect upper portions of coils wound around the stator core, a lower protection cover coupled to a lower portion of the insulation cover to cover and protect lower portions of the coils, a hook configured to extend from the upper protection cover in the downward direction, and a hook-catching portion formed at the insulation cover such that the lower end portion of the hook is hooked thereon in the upward direction.

9 Claims, 8 Drawing Sheets

(56) References Cited

U.S. PATENT DOCUMENTS

2015/0015095 A1* 1/2015 Kurono .................... H02K 3/24
                                                        310/54
2015/0311764 A1* 10/2015 Nakamura ............. H02K 3/522
                                                        310/71

* cited by examiner

[ CROSS-SECTIONAL VIEW TAKEN ALONG A-A ]

[ ULTRASONIC WELDING ]

RESOLVER

CROSS-REFERENCE TO RELATED APPLICATION

The present application claims priority to and the benefit of Korean Patent Application No. 10-2017-0175873 filed on Dec. 20, 2017, which is incorporated herein by reference in its entirety.

TECHNICAL FIELD

The present disclosure relates to a resolver. More particularly, it relates to a resolver that has a configuration capable of effectively protecting coils wound around a core, thereby preventing damage to the coils attributable to external physical impacts or force, enhancing the coupling force between components thereof, and consequently securing operational reliability even under severe conditions.

BACKGROUND

The statements in this section merely provide background information related to the present disclosure and may not constitute prior art.

In general, a vehicle is equipped with many electric motors, which generate torque necessary for operating devices by receiving power from a battery and supply the torque to the devices.

In order to control a motor, which is a rotary device, it is necessary to precisely and rapidly detect information about rotation of the motor. In particular, movement or a position of a rotary shaft must be measured accurately through detection of an angle of a rotor.

One of essential devices of a vehicle, which use a motor, is a motor-driven power steering (MDPS) system, which supplements the steering force applied by a driver using the power of the motor.

In the motor-driven power steering system, it is necessary to control a motor precisely. Therefore, the motor-driven power steering system requires a device capable of precisely detecting the angle of a rotor of a motor.

In addition, in eco-friendly vehicles, such as pure electric vehicles, hybrid electric vehicles and fuel cell electric vehicles, a motor is used as a drive source for driving the vehicle.

These eco-friendly vehicles are equipped with an inverter system for driving and controlling the motor, and a resolver is used as a position sensor for detecting the absolute angular position (θ) of a rotor of the motor, which is used to control the motor.

In order to perform vector control of a motor, a coordinate system needs to be set in synchronization with the magnetic flux position of the motor. To this end, it is necessary to read the absolute angular position of a rotor of the motor.

Accordingly, a resolver is used to detect the absolute angular position of the rotor of the motor. Each phase of the rotor of the motor is accurately sensed using the resolver, with the result that it is possible to perform motor speed control and torque control.

In general, the resolver includes a rotor, which a rotary shaft of a motor penetrates, and a ring-shaped stator, which faces the rotor while being spaced a predetermined gap apart from the rotor. Coils of the rotor and the stator are wound so that their magnetic flux distributions become sine waves corresponding to particular angles.

If excitation signals (M_REZ+ and M_REZ−) are applied to a primary-side coil (an input terminal), which is wound around a rotor of a resolver, and the rotor of the resolver is rotated by a rotary shaft of a motor (a rotor of a motor), the magnetic coupling coefficient is changed, and accordingly signals each having a carrier, the amplitude of which is changed, are generated in a secondary-side coil (an output terminal), which is wound around a stator of the resolver. In this case, the coils are wound so that the signals have cosine (cos) and sine (sin) forms depending on rotation angles (θ) of the rotor of the motor and the rotor of the resolver.

In the resolver, the rotor includes a plurality of salient poles, which are formed along the outer circumference thereof, and the ring-shaped stator includes a plurality of teeth and a plurality of slots, which are alternately formed along the inner circumference thereof. Coils of the stator are received in the slots while being wound around the teeth.

However, a conventional resolver has no special structure designed to protect coils, and thus the coils may be easily damaged by external physical impacts or force. Moreover, the bonding force or coupling force between components of the resolver is low.

The above information disclosed in this Background section is only for enhancement of understanding of the background of the disclosure and therefore it may contain information that does not form the prior art that is already known in this country to a person of ordinary skill in the art.

SUMMARY

The present disclosure provides a resolver that has a configuration capable of effectively protecting coils wound around a core, thereby preventing damage to the coils attributable to external physical impacts or force and enhancing the coupling force between components thereof, consequently securing operational reliability even under severe conditions.

In one aspect, the present disclosure provides a resolver including a stator core, an insulation cover configured to cover and insulate the stator core, an upper protection cover coupled to the upper portion of the insulation cover, the upper protection cover being configured to cover and protect the upper portions of coils wound around the stator core, a lower protection cover coupled to the lower portion of the insulation cover, the lower protection cover being configured to cover and protect the lower portions of the coils, at least one hook extending from the upper protection cover in the downward direction, and at least one hook-catching portion formed at the insulation cover so that the lower end portion of the hook is hooked thereon in the upward direction.

In some forms of the present disclosure, each of the insulation cover, the upper protection cover and the lower protection cover may be formed in a shape of a ring that extends along the stator core.

In some forms of the present disclosure, the insulation cover may be coupled and fixed at a lower end portion thereof to the lower protection cover through ultrasonic welding.

In some forms of the present disclosure, each of the insulation cover and the lower protection cover may be formed in a shape of a ring that extends along the stator core, and the lower protection cover may include an energy director, the energy director being formed in the circumferential direction of the lower protection cover so that the lower end portion of the insulation cover is ultrasonic-welded to the lower protection cover over the entire circumference of the lower protection cover by the energy director.

In some forms of the present disclosure, the upper protection cover may include a plate portion formed in a ring shape, the plate portion having a bottom surface from which the hook extends in the downward direction, and a side wall extending continuously along the outer circumferential surface of the plate portion and protruding in the downward direction. The hook may be hooked on the hook-catching portion in the state in which the side wall is in close contact with the outer circumferential surface of the insulation cover.

In some forms of the present disclosure, the hook-catching portion may be a recess having therein a step in which the lower end portion of the hook is inserted and caught in the upward direction.

In some forms of the present disclosure, the at least one hook may include a plurality of hooks arranged at predetermined intervals in the circumferential direction of the upper protection cover, and the at least one hook-catching portion may include a plurality of hook-catching portions arranged at predetermined intervals in the circumferential direction of the insulation cover.

In some forms of the present disclosure, the lower protection cover may include at least one hook-fixing portion configured to support the lower end portion of the hook hooked on the hook-catching portion of the insulation cover in order to prevent the hook from being separated from the hook-catching portion.

In some forms of the present disclosure, the lower protection cover may include a plate portion formed in a ring shape, the plate portion having a top surface from which the hook-fixing portion protrudes to a predetermined height in the upward direction, and a side wall extending continuously along the outer circumferential surface of the plate portion and protruding in the upward direction.

Other forms of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
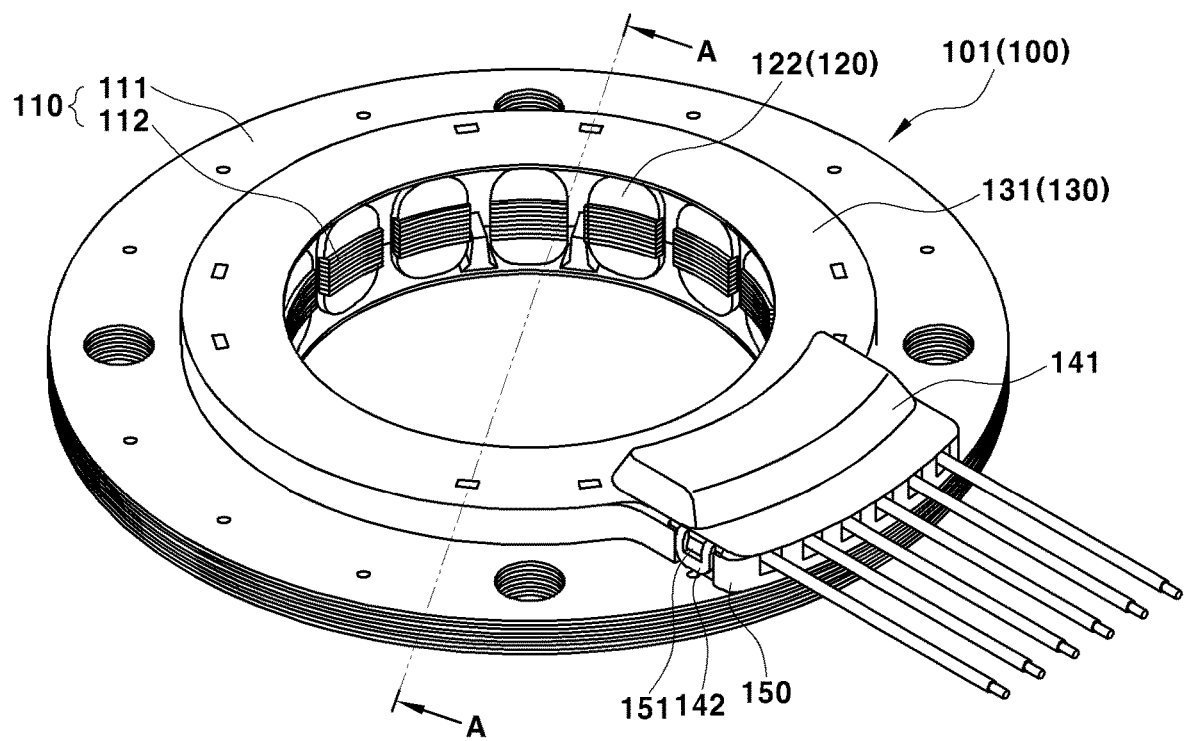
FIG. 1 is a perspective view of a resolver in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "include" and variations such as "includes" or "including" will be understood to imply the inclusion of stated elements but not the exclusion of any other elements.

FIG. 1 is a perspective view of a resolver in some forms of the present disclosure. In FIG. 1, illustration of a rotor of a resolver, which is integrally coupled to a rotary shaft of a motor, is omitted, and components of a stator 101 are illustrated.

Figure 2:
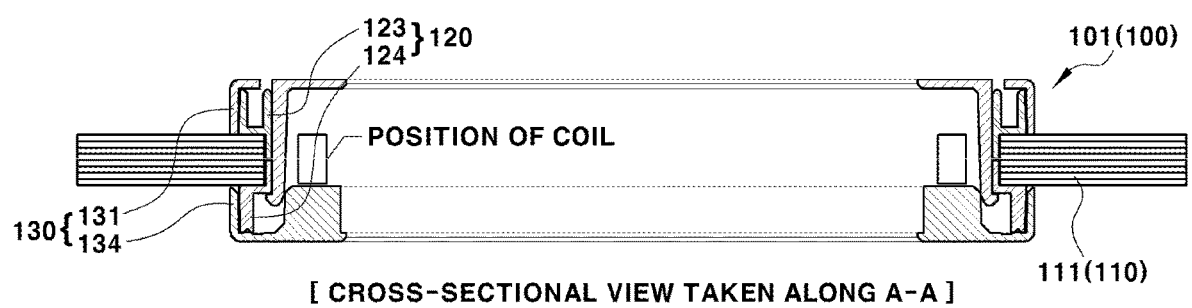
FIG. 2 is a cross-sectional view taken along line A-A in FIG. 1.
Figure 3:
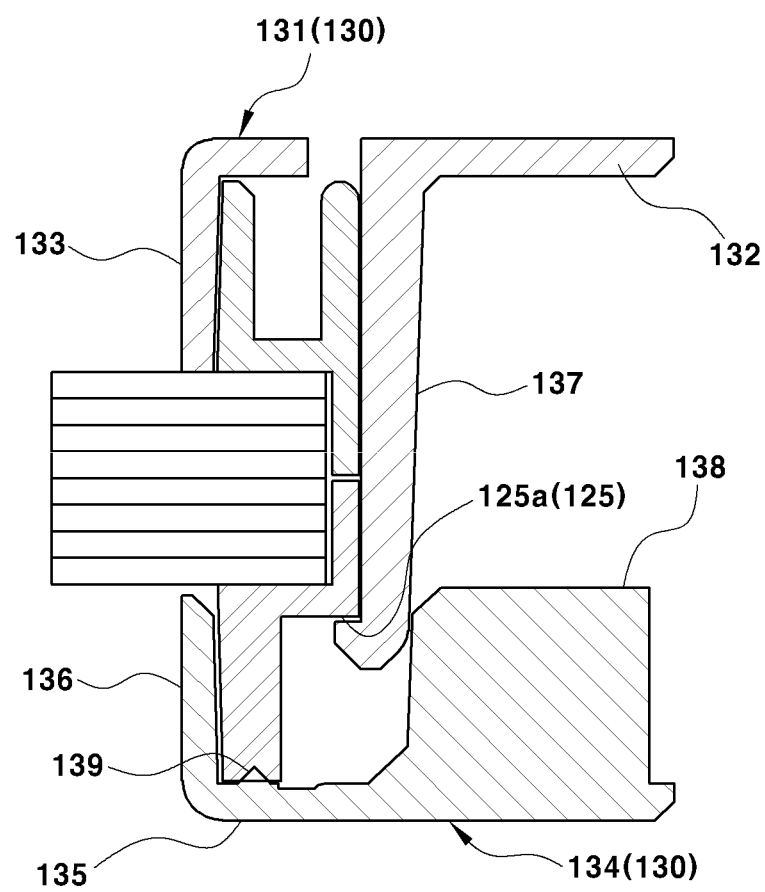
FIG. 3 is an enlarged cross-sectional view showing the coupling state of a coil protection cover and an insulation cover in the resolver in one form of the present disclosure.

FIG. 2 is a cross-sectional view taken along line A-A in FIG. 1, and FIG. 3 is an enlarged cross-sectional view showing the coupling state of a coil protection cover and an insulation cover in the resolver in some forms of the present disclosure.

Figure 4:
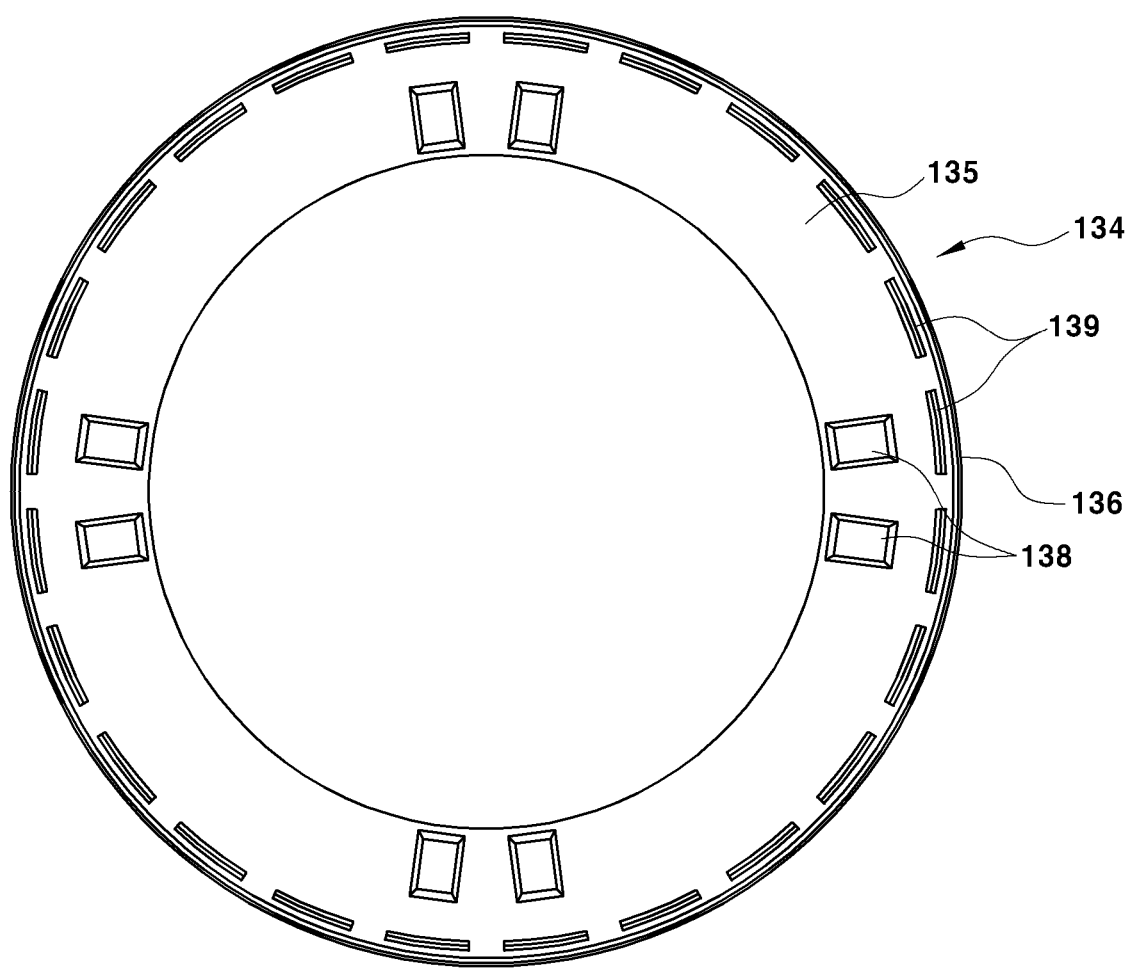
FIG. 4 is a plan view of a lower protection cover in the resolver in one form of the present disclosure.

FIG. 4 is a plan view of a lower protection cover in the resolver in some forms of the present disclosure.

As illustrated, the resolver 100 in some forms of the present disclosure includes a stator 101, which has a ring shape overall. The stator 101 includes a stator core 110, an insulation cover 120, a coil protection cover 130, and a terminal unit 150.

Since the stator 101 has a ring shape overall, each of the stator core 110, the insulation cover 120 and the coil protection cover 130 is also formed so as to have a ring shape overall.

The stator core 110 includes a ring-shaped core body 111 and a plurality of teeth 112, which protrude from the inner circumferential surface of the core body 111 and are arranged at predetermined intervals.

As such, since the teeth 112 protrude from the inner circumferential surface of the core body 111 and are arranged at predetermined intervals, the stator core 110 has a structure in which the teeth 112 and slots are alternately formed.

The insulation cover 120 is a component for covering the stator core 110 to insulate the same. The terminal unit 150 is mounted to a portion of the insulation cover 120 in order to connect coils to an external circuit.

The insulation cover 120 includes a ring-shaped cover body 121 and a plurality of teeth insulation portions 122, which protrude from the inner circumferential surface of the cover body 121 and are arranged at predetermined intervals. The cover body 121 covers a portion of the core body 111 to insulate the same, and each of the teeth insulation portions 122 covers a portion of a corresponding one of the teeth 112 to insulate the same.

Stator coils (not illustrated) are wound around the teeth insulation portions 122 of the insulation cover 120, which cover the teeth 112 of the stator core 110.

The insulation cover 120 may include an upper insulation cover 123 and a lower insulation cover 124, which are separately formed in order to cover and insulate the top surfaces of the core body 111 and the teeth 112 and the bottom surfaces of the core body 111 and the teeth 112, respectively.

The main feature of the present disclosure is that the coil protection cover 130 for protecting the stator coils wound around the stator core 110 is assembled with the insulation cover 120.

The coil protection cover 130 is formed so as to have a ring shape overall, and includes an upper protection cover 131, which is assembled with the upper portion of the insulation cover 120, and a lower protection cover 134, which is assembled with the lower portion of the insulation cover 120.

Each of the upper protection cover 131 and the lower protection cover 134 is formed so as to have a ring shape overall. The upper protection cover 131 serves to cover and protect the upper portions of the coils wound around the teeth insulation portions 122 of the insulation cover 120, and the lower protection cover 134 serves to cover and protect the lower portions of the coils.

The upper protection cover 131 includes a ring-shaped plate portion 132 and a side wall 133, which continuously extends along the outer circumferential surface of the plate portion 132 and protrudes downwards. The upper protection cover 131 further includes at least one hook 137 extending longitudinally from the bottom surface of the plate portion 132 in the vertical direction.

The hook 137 is arranged on the bottom surface of the plate portion 132 of the upper protection cover 131 while being spaced a predetermined distance apart from the side wall 133 in the inward direction from the side wall 133. The lower end portion of the hook 137 is hooked on at least one hook-catching portion 125 of the insulation cover 120 in the upward direction.

The hook-catching portion 125 is formed at the insulation cover 120 in a shape that allows the lower end portion of the hook 137 extending longitudinally in the downward direction to be hooked thereon in the upward direction.

In some forms of the present disclosure, the hook-catching portion 125 may have a step 125a, which is formed at the insulation cover 120, specifically, at the lower insulation cover 124, so as to allow the lower end portion of the hook 137 to be hooked thereon in the upward direction.

In some forms of the present disclosure, the hook-catching portion 125 may be embodied by a recess (indicated by reference numeral 125 in FIG. 5), in which the lower end portion of the hook 137 is inserted and caught. That is, the lower end portion of the hook 137 is inserted into the recess 125, and is caught by the step 125a formed in the recess 125 in the upward direction.

In the state in which the side wall 133 of the upper protection cover 131 is in close contact with and is supported by the outer circumferential surface of the cover body 121 of the insulation cover 120, specifically, the outer circumferential surface of the cover body 121 of the upper insulation cover 123, the hook 137 is hooked on the hook-catching portion 125 of the insulation cover 120 in the upward direction, with the result that the state in which the upper protection cover 131 is assembled with the insulation cover 120 is maintained.

In some forms of the present disclosure, a plurality of hooks 137 may be formed on the bottom surface of the plate portion 132 of the upper protection cover 131, and a plurality of hook-catching portions 125 may be provided in the same number as the number of hooks 137 in a manner such that each of the hook-catching portions 125 is formed at a portion of the insulation cover 120 that corresponds to a position of a respective one of the hooks 137.

The hooks 137 may be arranged at predetermined intervals in the circumferential direction of the upper protection cover 131, and the hook-catching portions 125 may be arranged at predetermined intervals in the circumferential direction of the insulation cover 120.

The lower protection cover 134 includes a ring-shaped plate portion 135 and a side wall 136, which continuously extends along the outer circumferential surface of the plate portion 135 and protrudes upwards. The lower protection cover 134 further includes at least one hook-fixing portion 138 extending from the top surface of the plate portion 135 to a predetermined height in the upward direction.

The hook-fixing portion 138 is arranged on the top surface of the plate portion 135 of the lower protection cover 134 while being spaced a predetermined distance apart from the side wall 136 in the inward direction from the side wall 136. The upper end portion of the hook-fixing portion 138 supports the rear side (the inner side in the radial direction) of the lower end portion of the hook 137, which is hooked on the hook-catching portion 125.

The hook-fixing portion 138 serves to firmly maintain the hook 137 in a hooked position on the hook-catching portion 125 of the insulation cover 120, that is, serves to ensure the stable and firm locking state of the hook 137. In addition, the hook-fixing portion 138 prevents backward movement (inward movement in the radial direction) of the hook 137 hooked on the hook-catching portion 125, thereby preventing the hook 137 from being separated from the hook-catching portion 125.

Due to this separation-preventing function of the hook-fixing portion 138, the upper protection cover 131 can be more stably coupled and fixed to the insulation cover 120 by the hook 137.

In the state in which the lower protection cover 134 is coupled to the insulation cover 120, specifically, to the lower insulation cover 124, the side wall 136 of the lower protection cover 134 is in close contact with and is supported by the outer circumferential surface of the cover body 121 of the lower insulation cover 124.

The insulation cover 120 and the coil protection cover 134 may be bonded and fixed to each other using a welding method.

Specifically, the lower end portion of the lower insulation cover 124 may be bonded and fixed to the top surface of the plate portion 135 of the lower protection cover 134 using a welding method such as, for example, ultrasonic welding.

At this time, in order to achieve stable bonding and fixing, it is desirable to ensure that the welding area between the components, which are bonded to each other, is as large as possible.

In order to perform ultrasonic welding, an energy director may be formed on the bonding surface of a component. In some forms of the present disclosure, an energy director 139 may be formed on a portion of the coil protection cover 130, to which the lower end portion of the insulation cover 120 is bonded, specifically, may be formed on a portion of the top surface of the plate portion 135 of the lower protection cover 134, to which the lower end portion of the lower insulation cover 124 is bonded.

The energy director 139 may be embodied by a protrusion, which is formed in the shape of a mountain that has two symmetrically inclined surfaces ending in a point at the top.

In addition, the energy director 139 is formed on the top surface of the plate portion 135 of the lower protection cover 134 so as to have a shape that corresponds to the shape of the lower end portion of the lower insulation cover 124, which extends in the circumferential direction, thereby securely bringing the lower end portion of the lower insulation cover 124 into contact with the top of the energy director 139.

To this end, the energy director 139 is formed on the top surface of the plate portion 135 of the lower protection cover 134 so as to extend in the circumferential direction, in which the lower end portion of the lower insulation cover 124 extends.

The energy director 139 may be embodied by a protrusion that continuously extends in the circumferential direction along the edge of the top surface of the plate portion 135 of the lower protection cover 134. However, as shown in FIG. 4, a plurality of energy directors 139 may be formed so as to be arranged at predetermined intervals in the circumferential direction.

In addition, in order to sufficiently cover the energy director 139 of the coil protection cover 130, it is desirable for the thickness of the welding portion of the insulation cover 120 to be set to a predetermined value or more.

Specifically, in some forms of the present disclosure, it is desirable for the welding portion of the lower insulation cover 124, that is, the lower end portion of the lower insulation cover 124, which is bonded to the top surface of the plate portion 135 of the lower protection cover 134, to have a thickness of 1 mm or more.

As described above, since ultrasonic welding is performed on the energy director 139 formed in a circular shape, the insulation cover 120 and the coil protection cover 130 may be evenly welded to each other over the entire circumferences thereof. In addition, since the welding is performed over the entire circumferences of the insulation cover 120 and the coil protection cover 130, the welding area may increase.

This increase in the bonding (welding) area between the insulation cover 120 and the coil protection cover 130 may enhance the coupling force between the two covers after the ultrasonic welding, whereby the reliability of the resolver may be secured even under a condition of severe vibration.

Hereinafter, the process of assembling the coil protection cover and the insulation cover, which are configured as described above, will be described.

Figure 7:
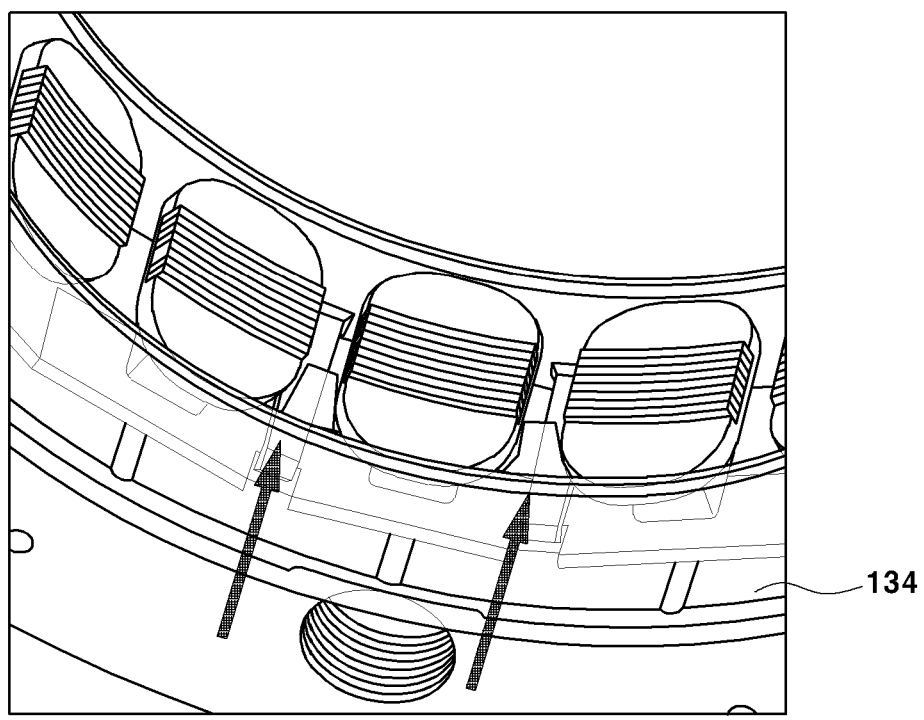
Figure 8:
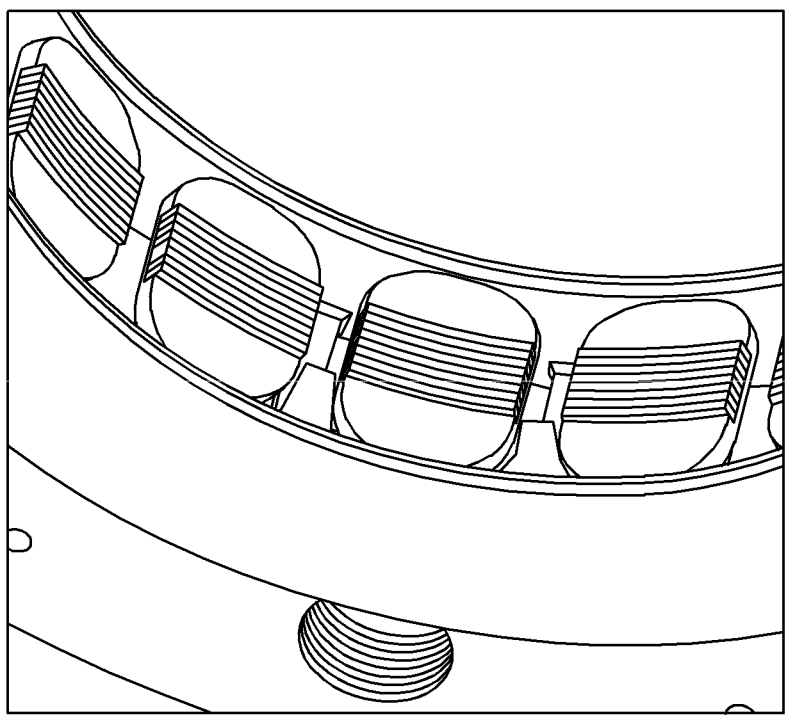
Figure 9:
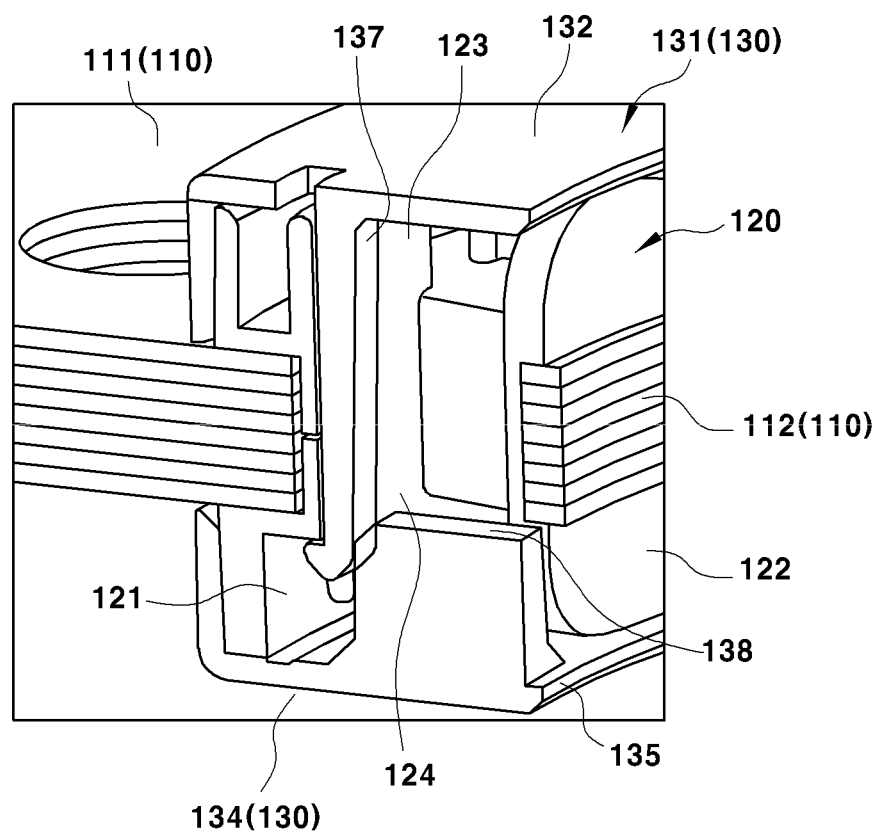
FIG. 9 is a perspective view showing the coupling state of the coil protection cover and the insulation cover in the resolver in one form of the present disclosure.

FIGS. 5 to 8 are perspective views showing the process of assembling the resolver in some forms of the present disclosure, and FIG. 9 is a perspective view showing the coupling state of the insulation cover 120 and the coil protection cover 130 in the resolver in some forms of the present disclosure.

Figure 5:
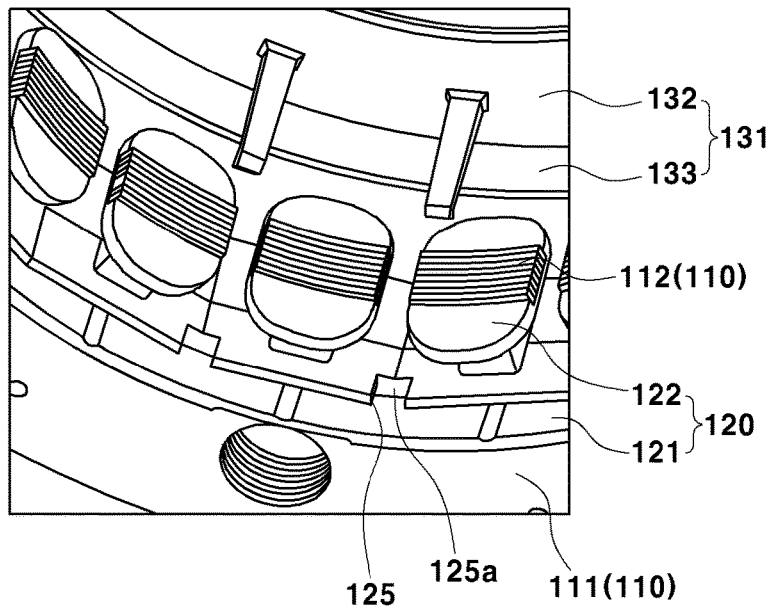
FIGS. 5 to 8 are perspective views showing the process of assembling the resolver in one form of the present disclosure.

First, in the state in which the stator core 110 and the insulation cover 120 are coupled to each other, as shown in FIG. 5, the upper protection cover 131 is assembled from the upper side of the insulation cover 120 in the downward direction.

Figure 6:
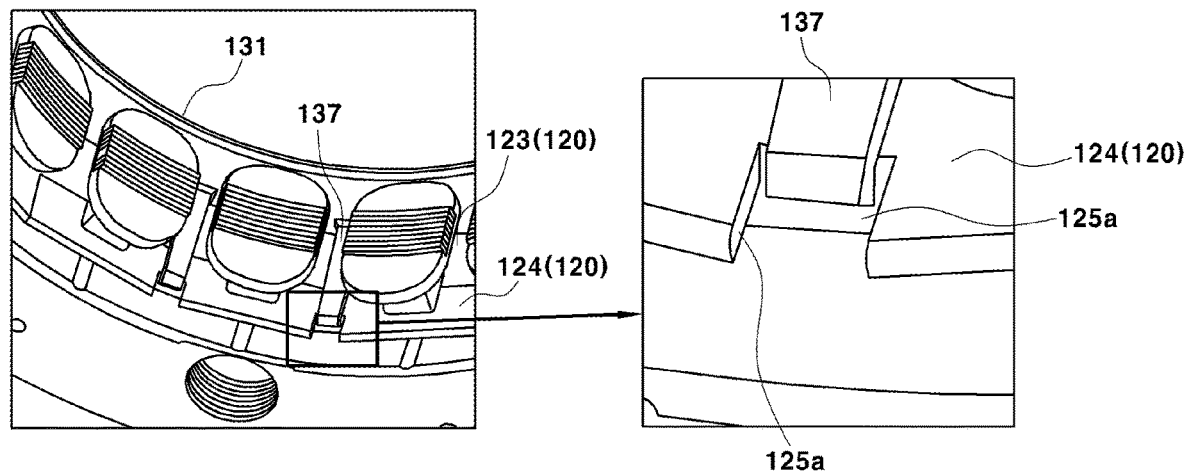

That is, the upper protection cover 131 is assembled with the insulation cover 120 by pushing the upper protection cover 131 in the downward direction. In this assembled state, as shown in FIG. 6, the lower end portion of the hook 137 formed at the upper protection cover 131 is inserted into the recess 125, which is the hook-catching portion of the insulation cover 120, and is hooked on the step 125*a*, which is formed in the recess 125 in the upward direction.

Subsequently, as shown in FIG. 7, the lower protection cover 134 is assembled from the lower side of the insulation cover 120 in the upward direction.

Subsequently, in order to couple and fix the lower protection cover 134 and the insulation cover 120 to each other, as shown in FIG. 8, ultrasonic welding is performed. At this time, as described above, ultrasonic welding is performed in the state in which the lower end portion of the lower insulation cover 124 is in contact with the top of the energy director (indicated by reference numeral 139 in FIG. 4) of the lower protection cover 134.

Through the above-described assembly process, the components are assembled with each other, as shown in FIGS. 4 and 9.

Figure 10:
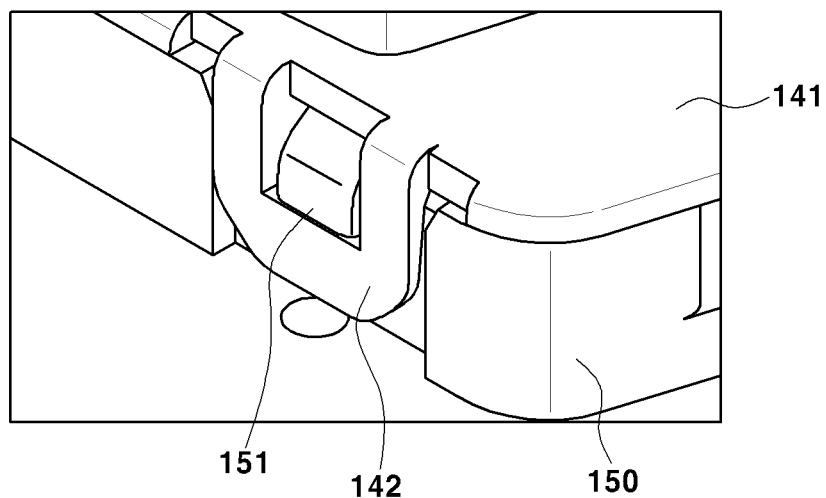
FIG. 10 is a perspective view showing the coupling state of a terminal protection portion of the coil protection cover and a terminal unit in the resolver in one form of the present disclosure.

FIG. 10 is a perspective view showing the coupling structure of the coil protection cover 130 and the terminal unit 150, which is mounted to a portion of the insulation cover in the resolver in some forms of the present disclosure.

As shown in FIG. 10, the terminal unit 150 is mounted to a portion of the insulation cover 120, and the upper protection cover 131 of the coil protection cover 130 is provided at a portion thereof with a terminal protection portion 141, which protrudes so as to cover the terminal unit 150.

The terminal protection portion 141 has a configuration capable of protecting the terminal unit 150. In order to couple the terminal protection portion 141, which is formed integrally with the coil protection cover 130, to the terminal unit 150, which is mounted to the insulation cover 120, the terminal protection portion 141 is provided with hooks 142, which protrude from the two opposite sides of the terminal protection portion 141 in the downward direction, and the terminal unit 150 is provided with latching protrusions 151, which protrude from the two opposite sides of the terminal unit 150 so that the hooks 142 are hooked thereon.

Accordingly, when the coil protection cover 130 is assembled with the insulation cover 120, the hooks 142 are hooked on the latching protrusions 151, with the result that the terminal protection portion 141, formed integrally with the coil protection cover 130 and the terminal unit 150, are securely locked to each other.

As is apparent from the above description, the present disclosure provides a resolver that includes a coil protection cover capable of protecting coils securely and effectively, thereby completely preventing damage to the coils attributable to external physical impacts or force.

In addition, the resolver in some forms of the present disclosure has a configuration in which components thereof are stably coupled to each other using a hook and a hook-fixing portion for preventing separation of the hook and in which welding is performed on a large area between a coil protection cover and an insulation cover over the entire circumferences thereof, thereby enhancing the coupling force between the components and securing operational reliability even under severe conditions.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A resolver comprising:
   a stator core;
   an insulation cover configured to cover and insulate the stator core;
   an upper protection cover coupled to an upper portion of the insulation cover, the upper protection cover configured to cover and protect upper portions of coils wound around the stator core;
   a lower protection cover coupled to a lower portion of the insulation cover, the lower protection cover configured to cover and protect lower portions of the coils;
   at least one hook configured to extend from the upper protection cover in a downward direction; and
   at least one hook-catching portion formed at the insulation cover such that a lower portion of the hook is hooked thereon in an upward direction.

2. The resolver of claim 1, wherein the insulation cover, the upper protection cover, and the lower protection cover, respectively, is formed in a ring shape that extends along the stator core.

3. The resolver of claim 1, wherein the lower portion of the insulation cover is coupled and fixed to the lower protection cover through ultrasonic welding.

4. The resolver of claim 3, wherein:
   the insulation cover and the lower protection cover, respectively, is formed in the ring shape that extends along the stator core, and
   the lower protection cover comprises an energy director, the energy director being formed in a circumferential direction of the lower protection cover such that the lower portion of the insulation cover is ultrasonic-welded to the lower protection cover over an entire circumference of the lower protection cover by the energy director.

5. The resolver of claim 1, wherein the upper protection cover comprises:
   a plate portion formed in a ring shape, the plate portion having a bottom surface from which the hook extends in the downward direction; and
   a side wall configured to extend continuously along an outer circumferential surface of the plate portion and to protrude in the downward direction,
   wherein the hook is hooked on the hook-catching portion when the side wall is in close contact with an outer circumferential surface of the insulation cover.

6. The resolver of claim 1, wherein the hook-catching portion is formed in a recess having a step in which the lower portion of the hook is inserted and caught in the upward direction.

7. The resolver of claim 1, wherein:
   the at least one hook comprises a plurality of hooks arranged at predetermined intervals in a circumferential direction of the upper protection cover, and
   the at least one hook-catching portion comprises a plurality of hook-catching portions arranged at predetermined intervals in a circumferential direction of the insulation cover.

8. The resolver of claim 1, wherein the lower protection cover comprises:
   at least one hook-fixing portion configured to:
      support a lower portion of the hook hooked on the hook-catching portion; and
      prevent the hook from being separated from the hook-catching portion.

9. The resolver of claim 8, wherein the lower protection cover comprises:
   a plate portion formed in a ring shape, the plate portion having a top surface from which the hook-fixing portion protrudes to a predetermined height in the upward direction; and
   a side wall configured to extend continuously along an outer circumferential surface of the plate portion and protruding in the upward direction.

* * * * *